Fig.1

INVENTORS
Florentin J. Pearne
Frank S. Pearne
BY
ATTORNEYS

Sept. 25, 1962

F. J. PEARNE ET AL 3,055,518

RACK LOADING METHOD AND APPARATUS

Filed March 30, 1959

INVENTORS
*Florentin J. Pearne*
*Frank S. Pearne*
BY
ATTORNEYS

Sept. 25, 1962     F. J. PEARNE ET AL     3,055,518
RACK LOADING METHOD AND APPARATUS
Filed March 30, 1959     5 Sheets-Sheet 5

INVENTORS
Florentin J. Pearne
Frank S. Pearne
BY
ATTORNEYS

United States Patent Office 3,055,518
Patented Sept. 25, 1962

3,055,518
RACK LOADING METHOD AND APPARATUS
Florentin J. Pearne and Frank S. Pearne, Los Angeles, Calif., assignors to Pearne and Lacy Machine Company, Inc., Los Angeles, Calif., a corporation of California
Filed Mar. 30, 1959, Ser. No. 802,981
6 Claims. (Cl. 214—16.4)

This invention relates to rack loading machines for receiving a multiplicity of elongated cylindrical objects one after another, and to methods for receiving and positioning the objects in alignment on a rack in a plurality of superposed rows, and moving the loaded rack away from the machine and an empty rack into position for loading.

The invention is particularly concerned with machines for receiving extruded green clay sewer pipe from a finishing machine and loading the pipe on racks for drying, the loaded racks then being moved toward any remote location where drying of the pipe is to be carried out. The invention is equally well adapted to receive dried clay pipe from a glazing machine for movement into a kiln, and for various other uses requiring the loading of a multiplicity of elongated cylindrical objects one after another onto racks for subsequent handling, transport, or storage. For illustrative purposes, the invention will be shown and described as applied to the handling of extruded green clay sewer pipe as it is discharged from a finishing machine associated with an extrusion press.

Until relatively recent years, clay sewer pipe was generally extruded vertically downwardly from a press, and the extrusions were transferred from the press and set vertically on pallets on which they could be transported and stored during drying. As long as the pipe was large enough in diameter and not of too great a length, such a system was capable of producing pipe of good quality, although it required careful handling of the pipe while setting them on the pallets and while transporting the loaded pallets away from the press to a finishing location and finally to a drying location.

More recently, horizontal extrusion of clay sewer pipe has become more commonly employed for the production of pipe of diameters up to about 12 inches, the extruded pipe being maintained in a horizontal position while finishing the bell and spigot ends thereof. Upon rolling the pipe from a finishing machine along a table to a receiving location, the finished green clay pipe were either turned vertically and stacked on their spigot ends on pallets for transport to a drying location, or they were rolled onto trays and the loaded trays manually manipulated onto multiple level drying racks, generally with the aid of a suitable hoist to carry the weight of the loaded trays. After the pipe had dried, they were generally manually pulled endwise from the trays, and the trays were then manually removed from the racks for reuse.

As the demand for clay pipe of smaller diameters developed, horizontal drying on trays became more common, since small diameter pipe of any substantial length tended to warp while standing on end during drying, and they were difficult to handle in that position on pallets without tipping over. It was found that less warping of the pipe occurred and transporting of the pipe was facilitated by resting the pipe horizontally on trays for transport and storage during drying. Horizontal drying became almost essential when making pipe as small at 4 inches in diameter and in lengths of 4 feet or more. With the present large demand for pipe of such sizes, the need has arisen for more efficient methods and apparatus for placing the pipe horizontally on drying racks.

The principal object of the present invention is to provide improved methods and apparatus for receiving horizontally disposed green clay pipe or the like from a finishing machine or other apparatus and loading the pipe horizontally onto trays or equivalent supports mounted in a plurality of superposed rows on a suitable rack, including methods and apparatus for moving a loaded rack away from the machine and moving an empty rack into position thereon for loading. Other more specific objects of the invention are to eliminate the separate handling of drying trays, both during loading and unloading of the racks, and to reduce the amount of strenuous labor required at any stage of the loading operation. A further object of the invention is to provide methods and apparatus by which any desired degree of automatic operation can be readily accomplished without danger of damaging the pipe.

The foregoing objects of the invention are accomplished by mounting an inclined table in position to receive pipe or the like and permit the same to roll down the table; providing an extension for the table that may be actuated stepwise between a fully retracted position and a fully extended position outwardly from the lower end of the table; providing an elevator below the extended table; and providing means for moving an empty, multiple level rack onto the elevator and removing it from the elevator after the rack has been loaded. By adjustment of the height of the elevator when carrying a rack, and coordinating actuation of the extension of the table, the extension can be projected into the rack to a first loading position at any of its various loading levels. The extension of the table can then be retracted stepwise to successive loading positions at the same rack level. By rolling pipe or the like down the table and along its extension in proper timed relationship to the stepwise retraction of the table, a pipe section can be delivered onto the rack at each loading position along one level of the rack. Thereupon, with the table extension fully retracted, the elevator can be actuated to dispose a second level of the rack at the proper elevation for loading pipe thereon in a similar manner. This can be repeated until a multiple level rack is fully loaded, whereupon the elevator can be actuated to an appropriate elevation or elevations for moving the loaded rack away from the elevator and replacing an empty rack thereon.

The foregoing objects and features of the invention will be more readily understood from the following detailed description of an illustrative embodiment of the invention and method of using the same, considered in connection with the accompanying drawings.

Referring to the drawings, and particularly to FIGS. 1, 2, 6, and 7, the apparatus of the invention may be associated with any machine or device from which sections of pipe or the like may be discharged one after another, at reasonably-spaced time intervals, by rolling them onto an inclined supporting surface. As shown by way of illustration, such machine or device (forming no part of the present invention) may be a conventional, horizontal, finishing machine 20 for trimming and finishing both ends of green clay sewer pipe while supporting the pipe horizontally on a tiltable cradle 21. As shown diagrammatically in FIG. 7, this machine may also comprise a base 22, rotary finishing tools 23 and 24 mounted on the base for movement axially into and out of engagement with the spigot and bell ends of a pipe while the tools are rotating and the pipe rests on the tiltable cradle 21, and a tray 25 for rolling pipe to and away from the cradle 21. Pipe to be finished may be rolled along the tray 25 of the finishing machine and onto the cradle 21, as indicated by an arrow 26, while the cradle is tilted in one direction to receive the pipe as it rolls. The cradle may be returned to a level position to support the pipe while it is being finished by the tools 23 and 24, whereupon the cradle may be tilted in the opposite direction to discharge the pipe onto the tray 25 with a rolling action in the direction indicated by an arrow 27.

Alternatively, the pipe finishing machine might be of the type disclosed in U.S. Patents 2,795,027 and 2,795,028 of John D. Rossier, which is adapted to receive the pipe from another tilting cradle disposed on one side of the finishing machine and associated with an extrusion press, as therein shown and described, and to discharge the finished pipe on the opposite side of the finishing machine with a rolling action. In that case, the tilting cradle of the finishing machine is also laterally movable and may serve the combined functions of the cradle 21 and tray 25 of the pipe finishing machine 20 shown therein. Similarly, other machines adapted to discharge elongated cylindrical objects onto a table with a rolling action may be substituted for the pipe finishing machine 20 within the intended scope of the present invention. A finished pipe or the like discharged from the finishing machine 20 and rolling along the tray 25 thereof (or similarly discharged from any other machine or device), may roll freely onto and downwardly along an inclined table, generally designated 30, which constitutes a part of the apparatus of the present invention.

The principal components of the apparatus of the invention may comprise the aforementioned inclined table 30; an associated table extension 31 mounted thereon for extension and retraction; an elevator 32 disposed below the extension 31 when in its extended position for receiving and positioning a rack R; a first conveyor 33 for moving an empty rack R onto the elevator 32 from one side thereof; and a second conveyor 34 for receiving a loaded rack from the opposite side of the elevator 32 and moving it to any remote location, e.g., to a location where the loaded rack may be picked up by the forks of a lift truck for transport to a pipe-drying room.

Figure 1:
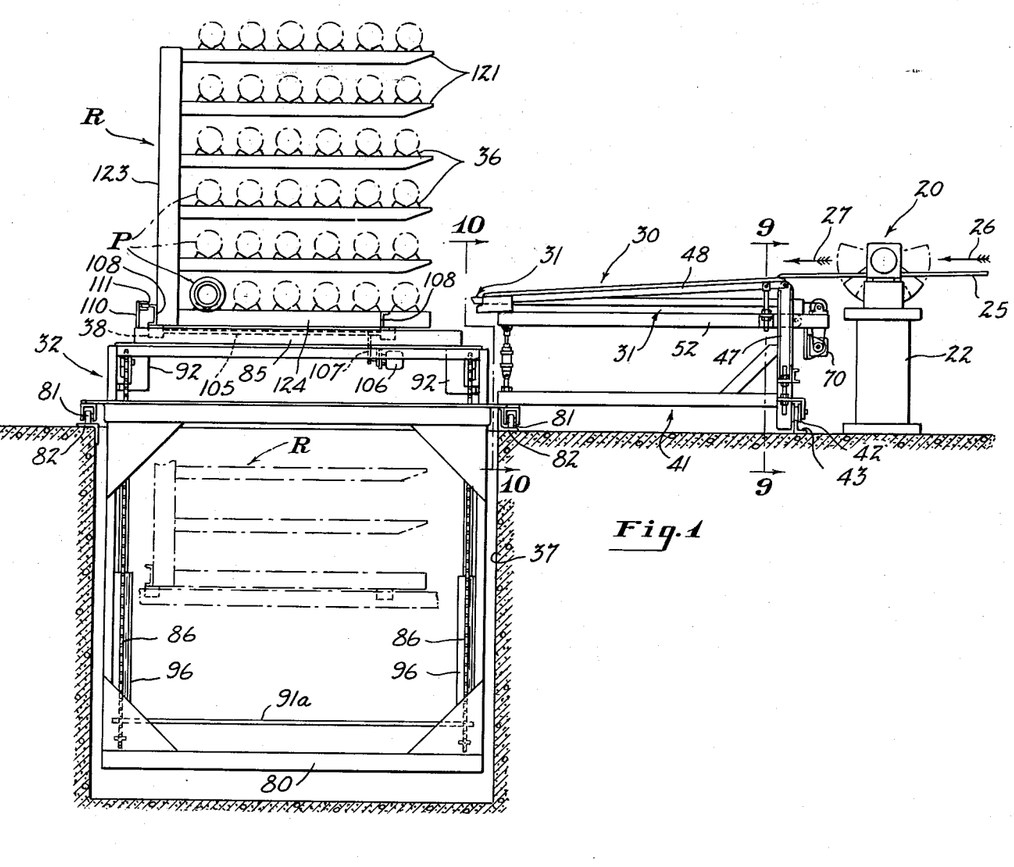
FIG. 1 is a side elevational view of a rack loading machine for carrying out the invention, disposed for receiving pipe from a conventional finishing machine, the view being taken as indicated by the line 1—1 in FIG. 2.
Figure 8:
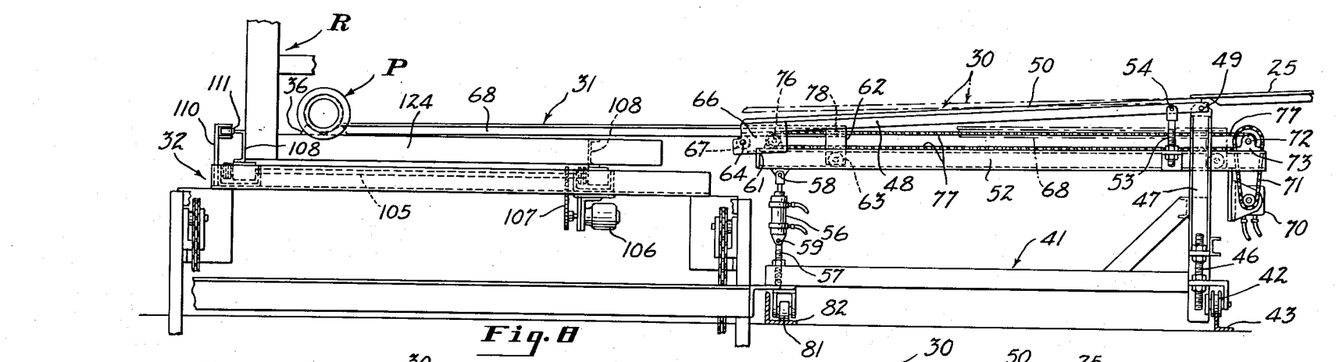
FIG. 8 is a fragmentary side elevation of the apparatus, similar to FIG. 1 but on an enlarged scale, showing an extension of the inclined table projecting over the elevator to a first rack loading position.

The inclined table 30 preferably includes a supporting framework that is adjustable to position the upper surface of the table at a desired elevation with a desired inclination as hereinafter described. The table extension 31 may be mounted on the same framework so as to extend and retract along the plane of its upper rolling surface under and closely adjacent the lower end of the table 30. In all positions of extension and retraction, the extension 31 is preferably substantially horizontally disposed with only a slight inclination downward in the direction of the outer end thereof. In its retracted position, the extension 31 is substantially coextensive with the table 30 (FIG. 1). In its fully extended position, the extension 31 normally projects outwardly over the elevator 32 to a first rack loading position (FIG. 8). When so extended, the extension 31 projects into the rack R on the elevator 32 to adjacent the far side of the rack. A pipe P, after rolling from the finishing machine 20 onto and downwardly along the inclined table 30 and its extension 31, is deposited at this first loading position, where it is supported on a pair of inverted angle members 36 of the rack. The extension 31 may then be retracted stepwise to each of a plurality of subsequent loading positions at the same level on the rack for depositing another pipe in a similar manner at each such position until that level of the rack is fully loaded, whereupon the extension is fully retracted to the position shown in FIG. 1.

The elevator 32 is preferably mounted in a pit 37 so that it may be lowered from an uppermost rack receiving and discharging position shown in solid lines in FIG. 1, at which a rack R is also supported when receiving pipe at its lowermost loading level. The elevator and the rack thereon are adapted to be lowered into the pit to a lowermost position indicated in phantom outline in FIG. 1, at which the rack is adapted to receive pipe at its uppermost loading level from the extension 31. The elevator may then be raised stepwise to position each lower loading level of the rack at the proper elevation for receiving pipe from the table extension 31. The rack is shown fully loaded in FIG. 1 and ready for removal after the elevator has been raised again to its uppermost position and the lowest level of the rack has been fully loaded. Obviously, if desired, the rack could be loaded from the bottom to the top while lowering the elevator stepwise, but this requires more power to raise the fully loaded rack to its discharge level.

Figures 2, 3, 4, 5:
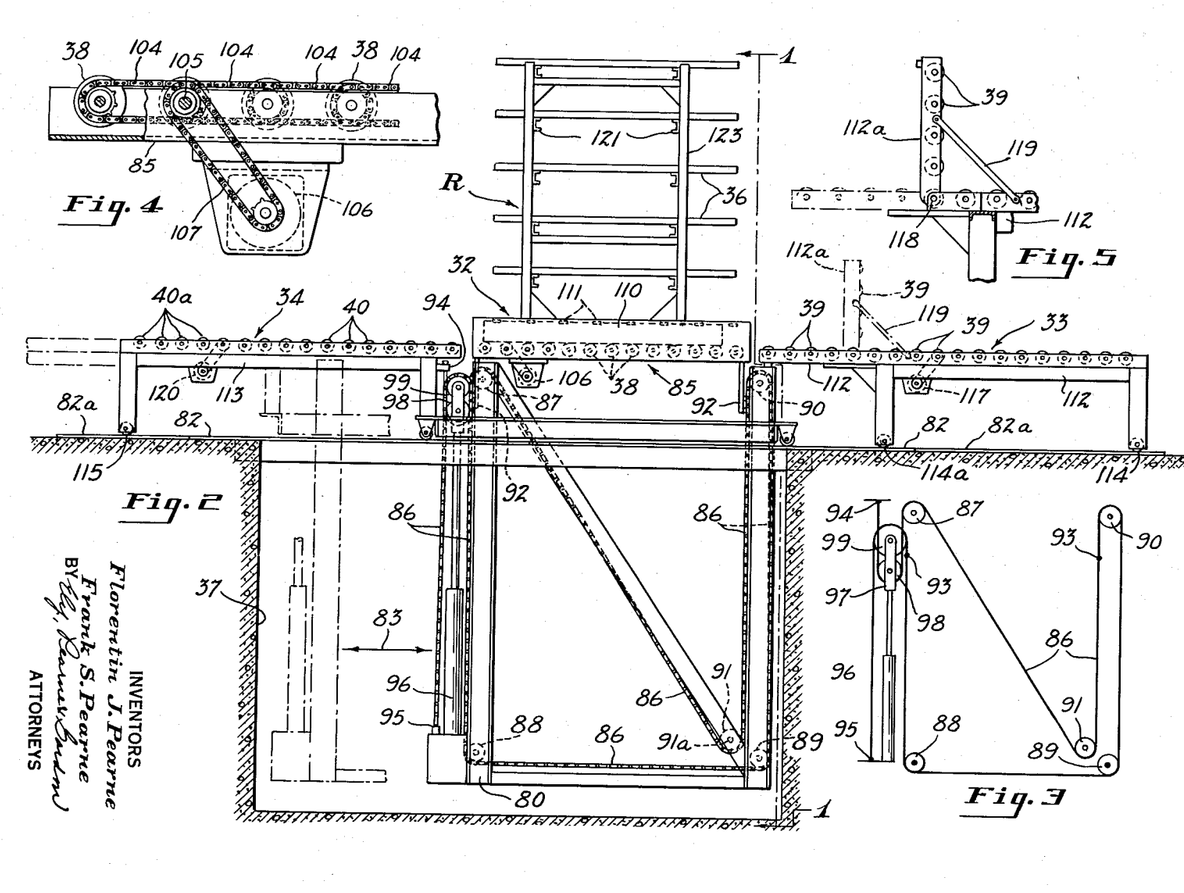
FIG. 2 is a simplified end elevation of the apparatus of FIG. 1, and additionally shows the conveyor for moving empty racks to the apparatus of FIG. 1.
FIG. 3 is a schematic diagram in elevation of an arrangement for raising and lowering an elevator constituting a part of the apparatus shown in FIGS. 1 and 2.
FIG. 4 is a fragmentary elevational view of mechanism for driving conveyor rollers on the elevator of the apparatus and on each of the conveyors that respectively move racks onto and away from the elevator.
FIG. 5 is a fragmentary elevational view of a portion of one of the conveyors which may be elevated to provide a passageway across the path of the conveyor, the view being taken as indicated by the line 5—5 in FIG. 6.

The uppermost position of the elevator 32 is also shown in FIG. 2. In this position of the elevator, the powered rollers 38 on the elevator, which support the rack R, are aligned both horizontally (FIG. 6) and vertically (FIG. 2) with similar rollers 39 and 40, respectively, of the aforementioned first conveyor 33 and second conveyor 34. When the rollers of the elevator and the two conveyors are simultaneously driven, a loaded rack R on the elevator may be transported thereby onto and along the second conveyor 34. At the same time, an empty rack (not shown) on the first conveyor 33 may be transported therealong and onto the elevator for loading from the table extension 31 as described above. Alternatively, of course, the rollers of the first conveyor 33 may be idle while a loaded rack is discharged from the elevator onto and along the second conveyor 34. Thereupon, the rollers of the second conveyor may be stopped, and the rollers of the first conveyor 33 may be started, while the elevator rollers continue to turn, so as to transport an empty rack along the first conveyor and onto the elevator. As will be apparent to those skilled in the art, any desired timing of the operation of the conveyor rollers may be obtained by manual control, or may be made automatic by the use of appropriately positioned limit switches connected through electrical relays to a suitable control system. Since the use of fluid motors for driving the conveyor and elevator rollers is contemplated, the control system may be of any conventional electrical type for actuating solenoids to open and close valves that control the flow of fluid through the motors.

With the foregoing general description of the principal components of the apparatus in mind, the following more detailed description thereof will be more readily appreciated.

When belled pipe is extruded from a press, it emerges bell end first from the die. When the pipe has been formed to the desired length, it is cut off at the die while supported on suitable off-bearing equipment. The off-bearing equipment may be designed to move the pipe axially away from the die a short distance so that the spigot end will clear the die when the pipe is moved transversely away from the press. The required axial movement of the severed pipe extrusion is obviously independent of the length of the extrusion, and is conveniently the same for all sizes of pipe. Thus, the spigot end of all sizes of pipe will commonly lie in the same vertical plane when the pipe is moved transversely from the press, but the bell end of the pipe will lie in a second vertical plane spaced different distances beyond the first vertical plane for different length pipe.

In order that the pipe will be supported only along the body of the pipe rearwardly of its bell end while being handled and transported during succeeding operations, succeeding equipment must be adjustable accordingly in a direction lengthwise of the pipe. Accordingly, the finishing tool on the finishing machine 20 for the spigot end of the pipe need have only a short path of axial movement toward and away from the pipe and, at most, will require only a small amount of axial adjustment. The finishing tool for the bell end of the pipe and the cradle 21 and tray 25, on the other hand, are desirably mounted on the base 22 of the finishing machine for substantial adjustment axially of the pipe to accommodate different lengths of pipe.

Similarly, the inclined table 30 and its extension 31 are desirably mounted for adjustment axially of the pipe to support it over substantially its entire length except for the necessary overhang of the bell end of the pipe. For this purpose, the framework 41 on which the table and its extension are mounted may be provided at one end with wheels 42 running on a track 43. The opposite end of the framework 41 may rest upon and be rigidly secured to the framework of the elevator 32, as shown. The elevator framework is also provided with supporting wheels running on tracks parallel with the track 43, for the same reason, and the elevator, the inclined table, and its extension are movable as a unit, as hereinafter described.

Figure 9:
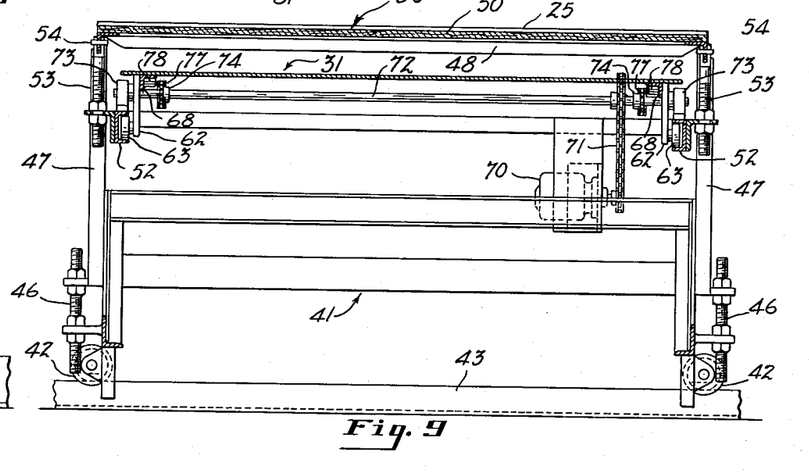
FIG. 9 is a vertical sectional view of the apparatus, the plane of the section being indicated by the line 9—9 in FIG. 1.
Figure 10:
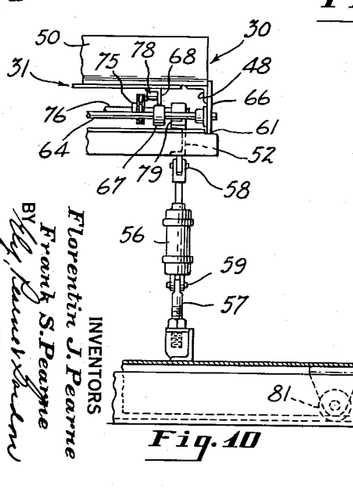
FIG. 10 is a fragmentary vertical sectional view of the apparatus, the plane of the section being indicated by the line 10—10 in FIG. 1.

To provide for adjustability of the height of the inclined table 30 and its extension 31, and for independent adjustment of their inclinations, three different sets of threaded adjusting screws are employed, as best shown in FIGS. 8–10. In addition, a set of hydraulic lifts is provided for momentarily lifting the pipe discharging end of the extension 31 while it is being extended toward its extreme position, in order to clear the pipe supporting angles 36 on a rack R into which it projects.

The first set of adjusting screws 46 connect the wheels 42 to the framework 41 for adjusting the height of this end of the framework. At the upper ends of posts 47 at this end of the framework, an upper adjustable frame section 48 for the table 30 is pivotally connected at 49. This upper frame section 48 includes a table top 50 on which pipe may roll. Adjacent the posts 47, a lower adjustable frame section 52 is suspended from the adjustable frame section 48 by a pair of adjusting screws 53 that are pivotally connected to the frame section 48 at 54. At the opposite end of the frame sections 48 and 52, the frame section 52 is supported by a pair of hydraulic piston and cylinder lift mechanisms 56 supported on the framework 41 by adjusting screws 57, these mechanisms being pivotally connected to the frame section 52 at 58 and including intermediate pivotal joints 59. This end of the frame section 48, at both corners, merely rests on the frame section 52 at 61 so as to permit slight longitudinal sliding of one on the other as the several sets of adjusting screws are adjusted and the hydraulic cylinder and piston mechanisms 56 are actuated.

The table extension 31 includes side plates 62 at one end (FIGS. 8 and 9) carrying wheels 63 which ride in channel members of the lower frame section 52 to support this end of the extension for longitudinal travel and also to restrain it against being lifted upwardly. Adjacent the pipe discharge end of the table 30 is a transverse shaft 64 (FIG. 10) journaled at its opposite ends on side plates 66 (FIGS. 8 and 10) of the upper frame section 48. Adjacent opposite ends of the shaft 64, a pair of rollers 67 (only one being shown, FIG. 10) are fixed thereto for rotation therewith, and a pair of longitudinal rails 68, secured to the under side of the extension 31, respectively ride on the rollers 67 to support the extension with a rolling action as it is extended and retracted.

Reversible movement of the extension 31 is effected by a reversible fluid motor 70 and a chain drive therefrom. This drive comprises a power transmitting chain 71 acting between a driving sprocket on the motor shaft and a driven sprocket fixed on a transverse shaft 72 that is journaled at its opposite ends in bearings 73 mounted on the lower frame section 52 (FIGS. 8 and 9). Adjacent opposite ends of the shaft 72, a pair of driving sprockets 74 are fixed thereon. Aligned therewith at the opposite end of the table 30 are a pair of driven sprockets 75 (only one being shown, FIG. 10) fixed on another transverse shaft 76 journaled at its opposite ends in a pair of bearings 79 (only one being shown, FIG. 10) carried by the lower frame section 52. A pair of chains 77 respectively pass around the driving and driven sprockets 73 and 74 at opposite sides of the table 30, and these chains are respectively pinned to the table extension 31 as shown at 78 (FIGS. 8 and 9). Thus, when the fluid motor 70 is driven in one direction, the pair of chains 77 move the extension 31 toward its fully extended position shown in FIG. 8, and when the motor 70 is driven in the opposite direction, the chains 77 move the extension 31 in the opposite direction toward its fully retracted position shown in FIG. 1.

A fluid motor, having the characteristic of stopping almost instantaneously upon actuation of valves to stop fluid flow through the motor, is admirably adapted for this service and for the other uses described herein, since the motor valves can be controlled by appropriately located limit switches and associated valve actuating solenoids to start rotation of the motor in either direction and to stop it precisely at the limits of travel of the device which it drives, and also at predetermined intermediate points as may be desired.

As will be seen from the foregoing description of the adjustable framework on which the table 30 and its extension 31 are mounted, the height and normal inclination of both the table and its extension may be set as desired by appropriate adjustment of the adjusting screws 46, 53, and 57. These adjustments are permitted by the pivotal connections 49, 54, 58, and 59, and by the longitudinal movement of the upper and lower frame sections 48 and 52 permitted at the points 61 where the former rests on the latter. As will also be readily appreciated, the length of the extension 31 is such that it must be supported at its outer end against a pipe support 36 of a rack R and by arms of the rack itself to support the weight of a pipe and provide for smooth rolling of the pipe off of the extension into its position on the rack (as shown in FIG. 8). In order to be fully extended for this purpose, the extension 31 must have its outer end raised slightly by appropriate actuation of the hydraulic piston and cylinder mechanisms 56, and lowered again by reverse actuation of the piston and cylinder mechanisms 56 when the extension 31 has been fully extended. During retraction of the extension 31, it need not be raised in this manner, since it will drag relatively smoothly over the pipe supporting angles 36 while moving in the retracting direction. Such actuation of the piston and cylinder mechanisms may readily be made responsive to extending movement of the extension 31.

Referring now to the details of the elevator 32, a main box-like framework 80 is supported by four wheels 81 running on a pair of tracks or rails 82 that straddle the pit 37 and extend for a substantial distance beyond the pit in both directions. The elevator framework 80 hangs downwardly into the pit, which is long enough in the direction in which the tracks or rails extend to permit adjusting travel of the elevator and of the table 30 and extension 31 supported thereby over an appreciable distance, as indicated by an arrow 83 and by a fragmentary phantom outline of the conveyor in FIG. 2.

An elevator platform 85 of suitably rigid construction is mounted within the elevator framework 80 for vertical travel controlled by the coordinated movement of a pair of chains 86. The chains 86 run on opposite sides of the platform 85 about respective sets of five sprockets mounted on the framework 80 for rotation in appropriately located fixed positions. The five fixed-position sprockets of each set, designated 87, 88, 89, 90, and 91, are respectively coaxially aligned with the corresponding sprockets of the other set to provide identical paths for the two chains 86. Corresponding sprockets 91, for example, may be fixed on opposite ends of a transverse shaft 91a (FIG. 1) for rotation therewith to maintain coordinated movement of the two chains 86. The other four sets of sprockets 87, 88, 89, and 90 may be independently mounted on separate stub shafts.

Figures 11, 12, 13:
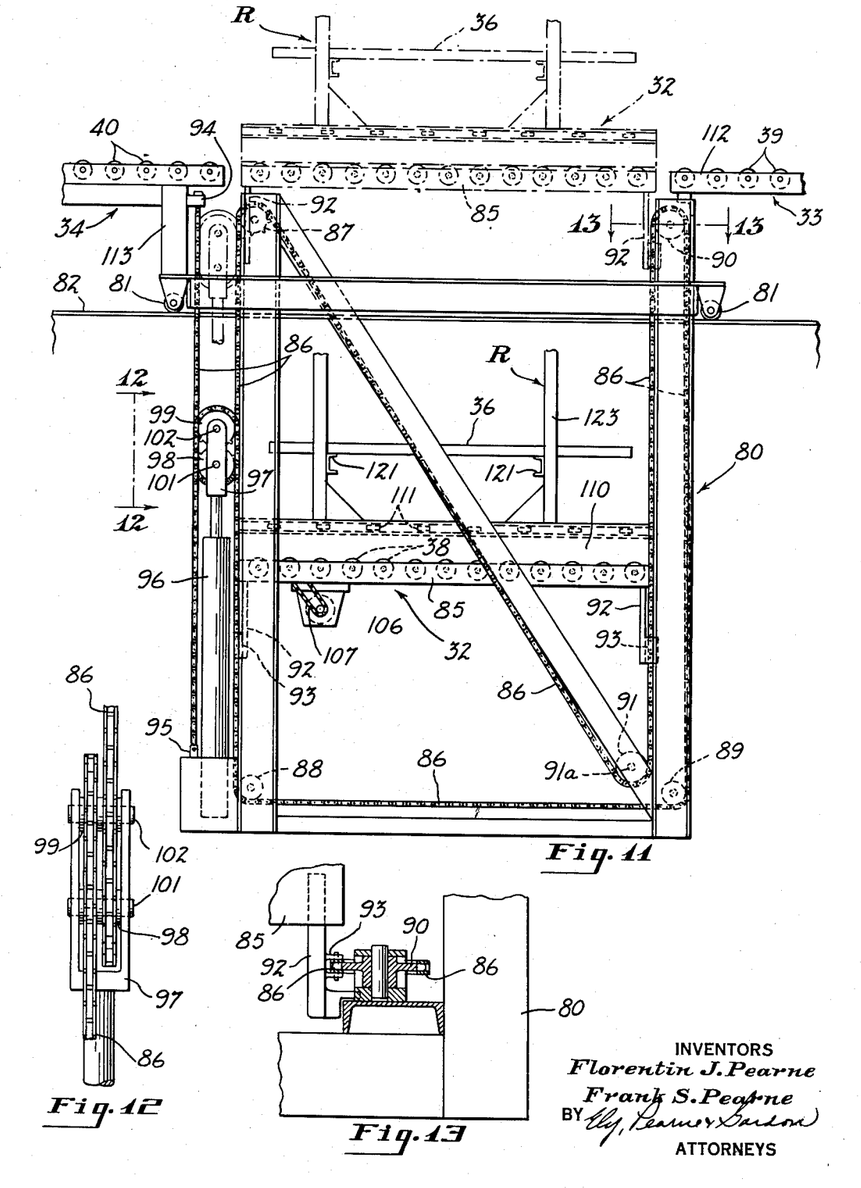
FIG. 11 is a fragmentary end elevation of the apparatus, similar to FIG. 2 but on an enlarged scale.
FIG. 12 is a fragmentary elevational view of the chain and sprocket mechanism by which the elevator of the apparatus is raised and lowered, the view being taken as indicated by the line 12—12 in FIG. 11.
FIG. 13 is a horizontal sectional view of another portion of the chain and sprocket mechanism for raising and lowering the elevator of the apparatus, the section being taken as indicated by the line 13—13 in FIG. 11.

One side of the platform 85 has a pair of rigid depending legs 92 which are secured to one of the chains 86 by clamps or brackets 93, and a corresponding pair of legs depend from the opposite side of the platform and are similarly secured to the other chain 86. Opposite ends of each chain 86 are respectively secured in upper and lower fixed locations 94 and 95 by suitable clamps or brackets. Travel of the chains about the sets of fixed-position sprockets 87—91 is effected by a pair of coordinated piston and cylinder mechanisms 96, each of which is adapted to raise and lower a double-sprocket traveling block 97 carried on the upper end of the piston. As shown in FIG. 12, traveling sprockets 98 and 99 on the traveling block 97 are offset relative to each other. They may be coaxially mounted side by side for independent rotation on a common shaft, but for clarity of illustration of the entire system in the drawings, they are shown mounted for rotation on separate, vertically spaced shafts 101 and 102, respectively. From its upper fixed end at 94, the chain 86 runs downwardly around the lower traveling sprocket 98 and then upwardly and around the fixed-position sprocket 87. From its lower fixed end at 95, the chain runs upwardly around the upper traveling sprocket 99 and then downwardly and around the fixed-position sprocket 88. As will be most readily understood from FIG. 3, coordinated downward travel of the two blocks 97 will cause the two chains 86 to run about the several sprockets so as to lower both of the points 93 on both of the chains at which the elevator platform 85 is attached, and coordinated upward travel of the two blocks 97 will cause the two chains to run about the several sprockets in the opposite direction so as to raise the platform supporting points 93 thereon.

Figures 6, 7:
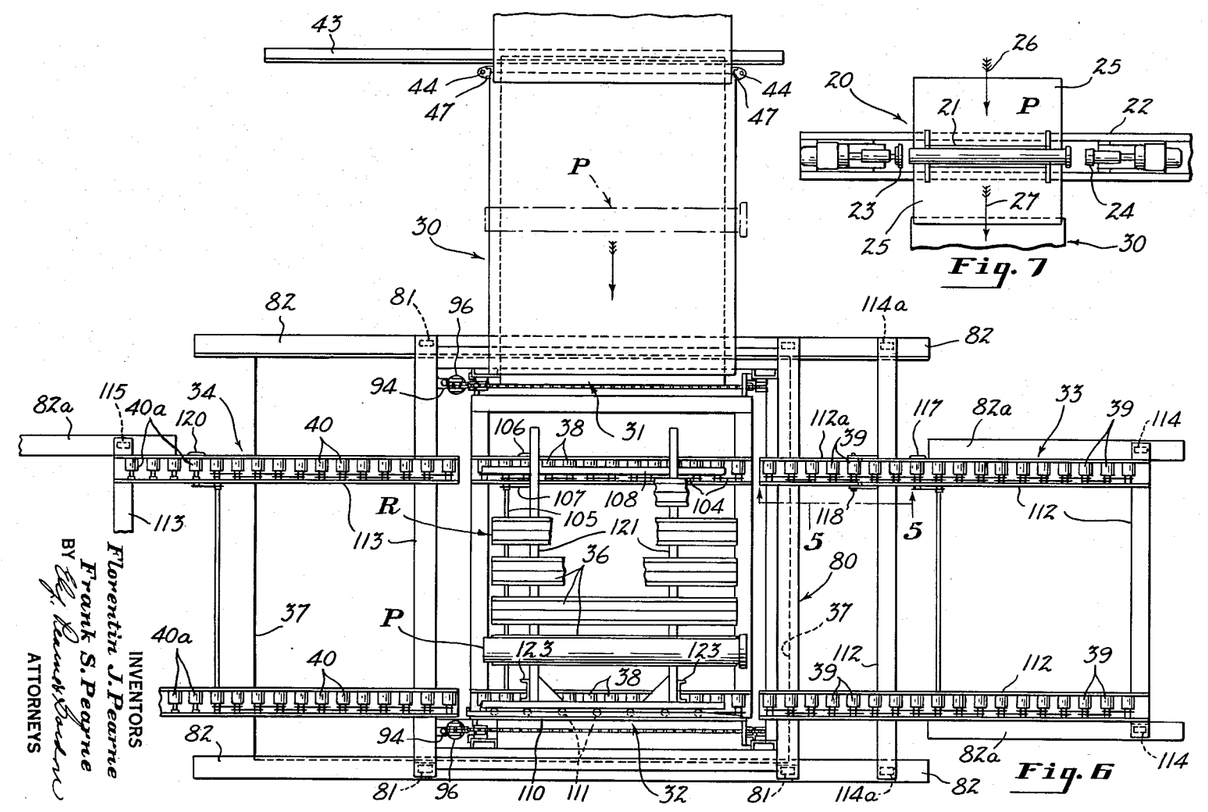
FIG. 6 is a plan view of the apparatus of FIGS. 1 and 2, only a fragment of the associated finishing machine being shown therein.
FIG. 7 is a plan view of the finishing machine associated with the apparatus of FIGS. 1 and 2.

As noted above, the elevator platform 85 is provided with conveyor rollers 38 for supporting and moving a rack R. As best shown in FIGS. 6 and 8, these conveyor rollers are arranged in two parallel sets extending along opposite sides of the platform 85, the corresponding rollers of each set being in coaxial alignment. The rollers 38 of each set are connected one to another by endless chains 104 in the manner shown in FIG. 4 so that rotation of one of the rollers causes corresponding rotation of all of the others in the set. The two sets of rollers are interconnected for corresponding rotation and are driven by a transverse shaft 105 having one of the rollers of each set fixed on its opposite ends for rotation therewith. The transverse shaft 105 is driven by a fluid motor 106 (FIGS. 1 and 3) mounted on the underside of the platform 85 and connected in driving relationship with the shaft 105 by a chain 107. Each rack R (hereinafter more fully described) is provided with lower channel-shaped rails 108 that ride on the rollers 38 and support the rack on the rollers for travel when the rollers are turned by the motor 106.

A side plate 110 along one side of the elevator platform 85 carries a series of guide rollers 111 mounted to turn on vertical axes. These rollers are engaged by a rack R as it moves onto the platform 85 and aid in guiding the rack to its proper loading position on the elevator. Additional guides of this character (not shown) may also be employed as needed on the opposite side of the elevator platform 85 and on the two conveyors.

The two conveyors 33 and 34 which lead to and from the elevator 32 are generally similar in design and comprise suitable rigid frames 112 and 113, each being mounted on wheels 114 and 115, respectively, that run along their respective sets of tracks 82a. In addition, the conveyor 33 is provided with a pair of additional wheels 114a spaced farther apart and riding on the tracks or rails 82 for the elevator 32 (FIGS. 2 and 6). Referring further to the conveyor 33, its parallel sets of rollers 39 are mounted and driven by a fluid motor 117 (FIG. 2) in the same manner as the rollers of the elevator platform 85. However, in order to provide a passageway for a machine attendant to walk between this conveyor 33 and the elevator 32 in the path of the conveyor, one side of the end portion of the conveyor adjacent the elevator and carrying the last four pairs of rollers 39 on that side of the conveyor is a separately constructed unit 112a pivotally connected to the main conveyor frame 112 as shown in FIG. 5. The pivotal connection 118 of this portion of the conveyor to the main frame thereof is coaxial with the adjacent roller on the main frame, whereby upward pivotal movement of this unit does not alter the spacing of the rollers thereon relative to the rollers mounted on the main frame and does not interfere with the chain drive that spans the pivotal joint. Any suitable conventional type of brace 119 may be provided for releasably holding the pivoted end portion of the conveyor 33 in its raised position. When lowered, this end portion 112a on one side of the conveyor 33 rests upon the framework 80 of the elevator 32, as shown in FIG. 2, and is preferably locked thereto in any desired manner (not shown). Similarly, the opposite side of the conveyor 33 which is integral with the rest of the frame 112 rests upon and is locked to the elevator frame 80 in any desired manner (not shown). Thus, the conveyor 33 is restrained against movement relative to the elevator.

The conveyor 34 is provided with its own wheels 115 at one end thereof only. The opposite end of its frame 113 is preferably supported on and releasably locked or rigidly secured to the elevator frame 80 so as to constitute an integral portion thereof and provide suitable anchoring points 94 for the elevator chains 86. The parallel sets of rollers 40 of this conveyor are driven by a fluid motor 120 (FIG. 2) in the same manner as the rollers of the elevator 32 and the conveyor 33, except that the last four rollers 40a on each side of this conveyor, at its discharge end, may suitably be without any driving connection with the other rollers 40 so that a loaded rack R will stop on the end rollers 40a for removal by a lift truck or the like.

Referring now to the rack R, it may be constructed in any desired manner so as to provide a number of cantilever shelves or pairs of parallel arms that are substantially uniformly spaced one above another. Suitably, pairs of parallel arms 121 are preferably employed, as shown, and are suitably connected to a single, rectangular, vertically disposed, supporting frame 123 on one side of the rack. The base 124 of the rack may suitably be of somewhat heavier construction and have the form of a closed rectangular frame to support the vertical frame 123 and the load carried thereby with sufficient rigidity and strength. As noted above, the base 124 has rails 108 secured adjacent its underside for riding on the conveyor and elevator rollers.

The equivalent of the conventional pipe trays of the prior art may be provided in the form of the angle irons 36 disposed in appropriately spaced pairs transversely of the rack arms 121. They may be removably secured to the arms 121 in any desired manner so their spacing can be adjusted to support different sizes of pipe, or they may be welded to the arms 121.

To place the machine in operation, the conveyor 33 is locked to the elevator 32 and the entire table, elevator, and conveyor assembly moved along the tracks 43, 82, and 82a as a unit to position the unit properly relative to the finishing machine 20 for receiving pipe of a predetermined length with the bell end of the pipe overhanging one side of the surfaces on which the pipe rolls or rests. A rack R is placed on the conveyor 33 and run onto the elevator 32 by operating the roller driving motors 106 and 117 and, optionally, 120. These motors may be automatically stopped and the elevator lowered to the first loading position of the rack by a suitable limit switch, hand operated stop, or other means (not shown) when the rack arrives at the proper, predetermined loading position on the elevator.

The loading of the rack will be largely understood from the foregoing description of the apparatus. Again, the operations may readily be controlled automatically to any desired degree by suitable limit switches and associated controls known to those skilled in the art. However, as each pipe rolls off the end of the table extension 31 into position on the rack, it is desirable to slow its motion and ease it gently into place on the rack. It is presently contemplated that this will be done manually by an attendant who may stand between the conveyor 33 and elevator 32. It is primarily to facilitate this that the passageway for the attendant is provided by swinging the gate portion 112a of the conveyor 33 upwardly to the position shown in FIG. 5.

While one rack is being loaded on the elevator 32, an empty rack may be positioned on the conveyor 33. When the rack on the elevator is loaded and ready for removal as shown in FIG. 1, the three roller driving motors are operated to move the loaded rack to the far end of the conveyor 34 while moving the empty rack from the conveyor 33 into loading position on the elevator. While this latter rack is being loaded, the previously loaded rack on the conveyor 34 may be removed.

It should be apparent from the foregoing that the invention provides an effective machine and method for achieving the aforementioned objectives in a most efficient manner. It should also be apparent that the invention is not limited to the particular details shown and described, except as may be required by the reasonable scope of the appended claims.

What is claimed is:

1. Rack loading apparatus comprising a table having an inclined top panel positioned to receive pipe for rolling down the panel from its upper end to its lower end, an extension having a pipe rolling upper surface, means mounting said extension on said table with its upper surface substantially contiguous to the lower end of said top panel to form a less steeply inclined, substantially uninterrupted continuation thereof, said mounting means including means for reciprocating said extension in the plane of its upper surface for extension and retraction, whereby the inclination of said extension relative to said top panel remains fixed during extension and retraction between a fully retracted position and each of a plurality of extended positions in which the extension projects different distances from the lower end of said panel to a corresponding plurality of rack loading positions, means operative to fully extend said extension and then retract it stepwise to each of its rack loading positions and then to its fully retracted position, means for adjusting the inclinations of said extension and of said top panel relative to each other and to the horizontal to control the speed of cylindrical objects rolling down the top panel and the extension thereof; an elevator disposed below said loading positions; and means for moving racks one after another onto and off of said elevator, whereby the elevator may be actuated to position the rack at various elevations in alignment with said top panel and its extension for receiving a pipe from the extension at each of its extended positions for each elevation of the rack.

2. The method of loading cylindrical objects onto a rack in a plurality of superposed rows by means of an elevator and an extensible inclined table having a normally stationary inclined portion and a lower end portion that is extensible over the elevator and retractable to clear the elevator, said method comprising adjusting the respective inclinations of the stationary inclined portion and extensible lower end portion of the table with respect to each other and to the horizontal to control the speed of cylindrical objects rolling down the table, moving said rack onto the elevator, actuating the elevator as required to position an extreme level of the rack adjacent the level of the lower end of the table, extending the lower end portion of the table into the rack at said extreme level to a first loading position on the rack, retracting the lower end portion of the table stepwise to successive loading positions on the rack while maintaining the previously adjusted inclinations of said stationary inclined portion and lower end portion of the table and while maintaining the lower end portion of the table substantially contiguous to the lower end of the stationary inclined portion as a substantially uninterrupted continuation thereof, rolling an object down the table onto the rack at each of said loading positions as the lower end portion of the table is retracted stepwise, fully retracting the table to clear the elevator, actuating the elevator to position a second level of the rack adjacent the level of the lower end portion of the table, sequentially repeating the extension and stepwise retraction of the lower end portion of the table, the rolling of objects down the table onto the rack, and the subsequent actuation of the elevator so as to load a plurality of objects onto the rack at each of a succession of levels of the rack until the rack is full, and removing the loaded rack from the elevator to free the elevator for receiving another rack to be loaded.

3. The method of loading cylindrical objects onto a rack in a plurality of superposed rows by means of an elevator and an extensible inclined table having a normally stationary inclined portion and a lower end portion that is extensible over the elevator and retractable to clear the elevator, said method comprising adjusting the respective inclinations of the stationary inclined portion and extensible lower end portion of the table with respect to each other and to the horizontal to control the speed of cylindrical objects rolling down the table, moving said rack horizontally onto the elevator at a first level of the elevator, actuating the elevator as required to position an extreme level of the rack adjacent the level of the lower end of the table, extending the lower end portion of the table into the rack at said extreme level to a first loading position on the rack, retracting the lower end portion of the table stepwise to successive loading positions on the rack while maintaining the previously adjusted inclinations of said stationary inclined portion and lower end portion of the table and while maintaining the lower end portion of the table substantially contiguous to the lower end of the stationary inclined portion as a substantially uninterrupted continuation thereof, rolling an object down the table onto the rack at each of said loading positions as the lower end portion of the table is retracted stepwise, fully retracting the table to clear the elevator, actuating the elevator to position a second level of the rack adjacent the level of the lower end portion of the table, sequentially repeating the extension and stepwise retraction of the lower end portion of the table, the rolling of objects down the table onto the rack, and the subsequent actuation of the elevator so as to load a plurality of objects onto the rack at each of a succession of levels of the rack until the rack is full, actuating the elevator as required to reposition it at said first level thereof, and moving the loaded rack horizontally from the elevator to free the elevator for receiving another rack to be loaded.

4. Rack loading apparatus comprising an inclined table positioned to receive pipe for rolling down the table, said table including a framework, an upper frame section pivotally connected at one end to the top of said framework, said upper frame section having a table top, a lower frame section, means suspending one end portion of said lower section from said upper section beneath its pivotally connected end, means connected to said framework for supporting the other end of said lower section, said upper section having its other end resting on said other end of said lower section so that said table top is inclined downwardly from the pivotally connected end of said upper section to its other end, an extension for said table, said extension having a pipe-rolling surface forming an uninterrupted continuation of the lower end of said table top; means mounting said extension on said lower section for reciprocal travel in the plane of its pipe-rolling surface between a fully retracted position beneath said upper section and a fully extended position in which said extension extends beyond said other end of said upper section; means operative to fully extend said extension and then retract it stepwise to a plurality of pipe-depositing positions and then to its fully retracted position; and means connected to the other end of said framework for receiving pipe rolled down said table and said extension in each of said pipe-depositing positions of said extension.

5. The structure as claimed in claim 4 where said table further includes means for varying the inclination of said table top so that the speed and momentum of pipe rolling down said table can be controlled.

6. The structure as claimed in claim 5 wherein said means for suspending said one end portion of said lower frame section includes means for raising and lowering said one end portion relative to its other end so that the plane of said pipe-rolling surface of said extension can be selectively positioned at different inclinations relative to said table top to thereby maintain a substantially constant velocity of pipe rolling on said pipe-rolling surface.

References Cited in the file of this patent

UNITED STATES PATENTS

| | | |
|---|---|---|
| 1,711,820 | Wilcke | May 7, 1929 |
| 2,065,673 | Fay | Dec. 29, 1936 |
| 2,194,125 | Rinehart | Mar. 19, 1940 |
| 2,423,557 | Gray | July 8, 1947 |
| 2,661,100 | Ashford | Dec. 1, 1953 |
| 2,721,645 | Eberle | Oct. 25, 1955 |